United States Patent [19]
Claussen et al.

[11] Patent Number: 5,997,108
[45] Date of Patent: Dec. 7, 1999

[54] PROCESS FOR CONTROLLING THE SPEED OF A VEHICLE TRAVELLING ON A SLOPE

[75] Inventors: Heiko Claussen, Hannover; Jürgen Eickhoff, Walgrode, both of Germany

[73] Assignee: Wabco GmbH, Hannover, Germany

[21] Appl. No.: 08/970,988

[22] Filed: Nov. 14, 1997

[30] Foreign Application Priority Data

Nov. 23, 1996 [DE] Germany .............. 196 48 559

[51] Int. Cl.⁶ .................. B60T 8/72; B60T 8/32
[52] U.S. Cl. ............ 303/192; 303/24.1; 188/180
[58] Field of Search .................. 303/191, 192, 303/24.1; 188/180, 181 A, 181 R

[56] References Cited

U.S. PATENT DOCUMENTS

| | | | |
|---|---|---|---|
| 4,852,950 | 8/1989 | Murakami | 180/197 X |
| 4,884,669 | 12/1989 | Ehrlinger | 303/192 |

FOREIGN PATENT DOCUMENTS

| | | |
|---|---|---|
| 0 336 913 A2 | 12/1989 | European Pat. Off. . |
| 25 22 958 A1 | 12/1976 | Germany . |
| 24 19 242 C2 | 10/1984 | Germany . |
| 37 36 807 A1 | 5/1989 | Germany . |
| 31 47 598 C2 | 4/1990 | Germany . |
| 42 42 169 A1 | 6/1994 | Germany . |
| 43 38 399 A1 | 11/1995 | Germany . |
| WO 96/11826 | 4/1996 | WIPO . |

*Primary Examiner*—Robert J. Oberleitner
*Assistant Examiner*—Jeffrey Woller
*Attorney, Agent, or Firm*—Proskauer Rose LLP

[57] ABSTRACT

A process for controlling the speed of a vehicle travelling on a slope is disclosed. The vehicle is equipped with an electronic system which, through active brake intervention, adjusts the speed of the vehicle to a predetermined constant hill descent speed upon actuation of a hill descent control mode. The process comprises generating in the electronic system a continuously variable desired speed, and upon actuation of said hill descent control mode, the desired speed is continuously adjusted until it is equal to the predetermined constant hill descent speed. While the desired speed is being adjusted, the vehicle speed is continuously adjusted through active brake intervention until it is equal to the desired speed, so that after a transition period, the vehicle speed is equal to the predetermined constant hill descent speed.

10 Claims, 4 Drawing Sheets

PROCESS FOR CONTROLLING THE SPEED OF A VEHICLE TRAVELLING ON A SLOPE

BACKGROUND OF THE INVENTION

The invention relates to a process for controlling the speed of a vehicle travelling on a slope by means of active braking intervention.

Road vehicles having systems that maintain the vehicle at a constant speed as it travels on a gradient by automatically applying the brakes ("active braking") are known. Such vehicles are, as a rule, equipped with an anti-locking brake system (ABS), as well as with an automatic slip control (ASR). The components of the ABS and ASR systems, such as the electronic control units, wheel speed sensors, solenoid regulating valves, etc., are used to effect the abovementioned speed regulation on a gradient. Using the known devices, the driver is relieved from having to actuate the brake pedal constantly when the vehicle is travelling on a gradient. Even with a changing incline, uniform speed is maintained.

In DE-A-24 19 242, an electro-pneumatic brake force control circuit is disclosed that maintains a constant vehicle speed as the vehicle travels on a gradient through active braking so long as neither the gas pedal nor the brake pedal is actuated. The speed regulation on a gradient is switched off immediately when either the brake pedal or the gas pedal is actuated, or as soon as the superimposed ABS becomes activated.

Equipping a vehicle with a "hill descent control" mode (referred to hereinafter as "HDC") is also known from International Patent Application WO 96/11826 A1. This type of speed regulation on a gradient can be switched on manually by the driver with the activation of a switch. This type of regulation is able to maintain the vehicle at a constant low speed on a steep slope by means of active regulated braking of the vehicle without the driver having to actuate the brake. This system is particularly suitable for off-road vehicles driving on a slope that is steep so that the engine braking effect is no longer sufficient to decelerate the vehicle, even when the vehicle is in the lowest gear.

It is the object of the present invention to provide a process for controlling the speed of a vehicle travelling on a slope whereby the transition between normal driving and the state with active braking state is rendered particularly comfortable.

SUMMARY OF THE INVENTION

This object is achieved by a process for controlling the speed of a vehicle travelling on a slope, wherein the vehicle is equipped with an electronic system which, through active brake intervention, adjusts the speed of the vehicle to a predetermined constant hill descent speed upon actuation of a hill descent control mode. The process comprises generating in the electronic system a continuously variable desired speed, and upon actuation of the hill descent control mode, the desired speed is continuously adjusted in the electronic system until it is equal to the predetermined constant hill descent speed. While said desired speed is being adjusted, the vehicle speed is continuously adjusted through active brake intervention until it is equal to the changing desired speed, so that after a transition period, the vehicle speed is equal to the predetermined constant hill descent speed.

DETAILED DESCRIPTION OF THE INVENTION

Figure 1:
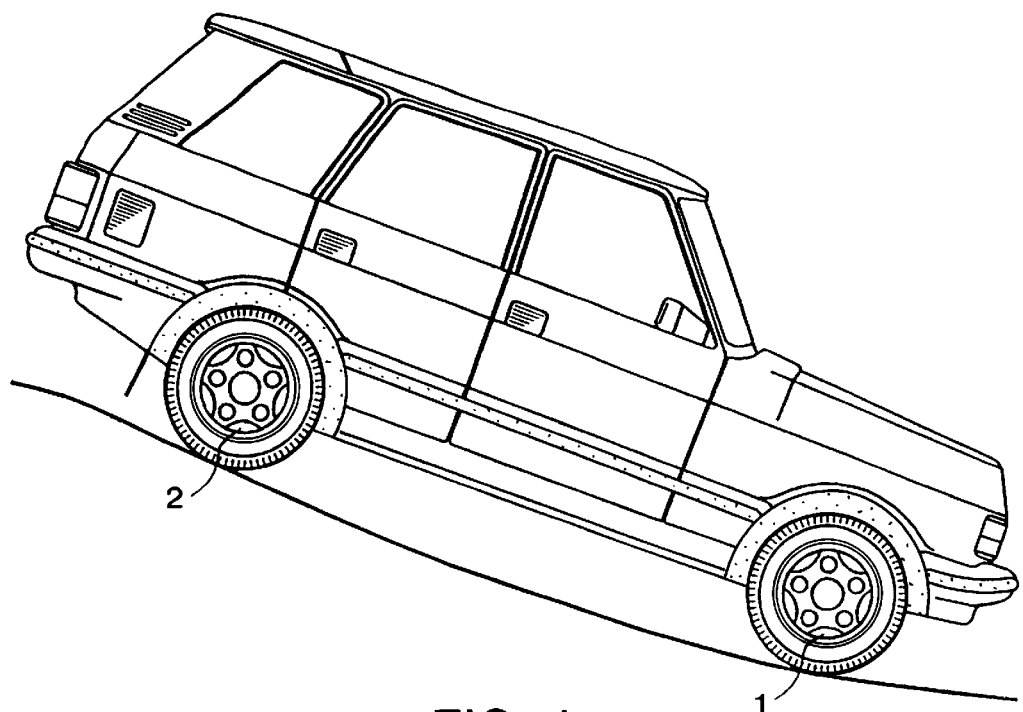
FIG. 1 shows a vehicle on a slope.

The vehicle illustrated in FIG. 1 has two axles (1) and (2), of which the front axle (1) is considered the lower or downhill axle, and rear axle (2) is considered the higher or uphill axle. The vehicle may travel forward or backwards on the gradient.

Figure 2:
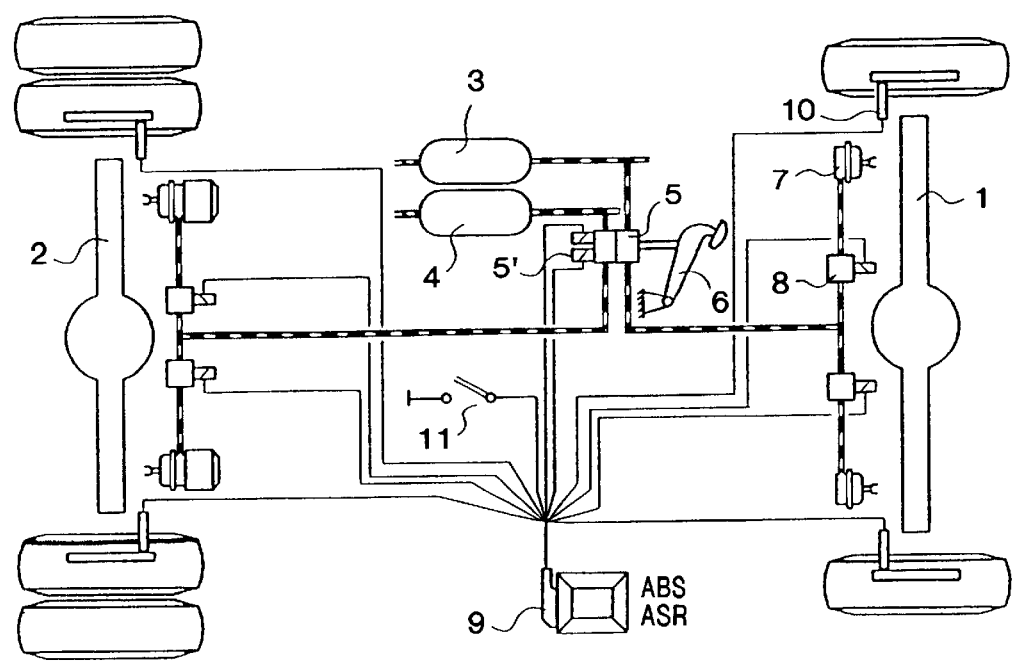
FIG. 2 shows a schematic representation of the pneumatic and electronic brake system of a vehicle.

FIG. 2 schematically shows the electronic and pneumatic systems of the vehicle illustrated in FIG. 1. In another embodiment, the pneumatic braking system shown here is replaced by a hydraulic or mixed braking system.

The vehicle shown has the two axles (1) and (2). The pressure medium for the braking system is supplied to the axles (1) and (2) by two pressure supply tanks (3, 4), one for each axle. The pressure medium is conveyed to the wheel brake cylinders (7) via a brake valve (5) which is actuated by a brake pedal (6). Disposed before the brake cylinders (7) are the ABS/ASR control solenoid valves (8). The brake valve (5) is provided with an ASR solenoid valve (5'), as brake pressure is applied to the individual wheels without the brake pedal (6) being pressed when the ASR is activated.

To control the above-mentioned solenoid valves, an ABS/ASR electronic control unit (9) is provided. The ABS/ASR electronic control unit (9) is connected by electrical connection lines to the above-mentioned solenoid valves (5, 5', 8). The electronic control unit (9) obtains behavioral information for each individual wheel from wheel sensors (10). An actuating switch (11) serves to switch on the active braking (HDC) function. In FIG. 2, pneumatic or hydraulic lines are shown by black/white lines while electrical lines are shown as thin continuous black lines.

The manner in which the system functions during controlled downhill travel is explained below in further detail.

The "hill descent control" function of the vehicle is recognized either automatically by the electronic control unit (9), or when the driver manually activates the switch (11). Upon activation of the hill descent control function, the ASR solenoid valve (5') becomes activated and direct braking pressure is brought to bear upon the brake cylinders (7) of the wheels of the front axle (1). At this stage, the electronic control unit (9) regulates the speed of the vehicle by actuating the solenoid valves (8) of the ABS system in such a manner that a predetermined speed is maintained independently of any changes in the slope.

If a wheel locks up during a controlled descent, the HDC function is of course replaced by the normal ABS function. The hill descent control is also superseded when the driver wishes to reduce a previously set constant speed or to increase it by pressing on the brake pedal or the gas pedal.

In order to avoid overheating the brakes during a long controlled hill descent, it is furthermore advantageous to provide for the monitoring of their temperature and to alert the driver by means of a warning system when a limit value has been exceeded. The driver then has the option of stopping the vehicle until the brakes have cooled off. Such monitoring of the brake temperature can be accomplished by means of temperature sensors (not shown) on the wheel brakes, or the brake temperature can be reproduced by an electronic model within the electronic system (9). Although the second method is less precise, it is also less expensive.

Figure 3:
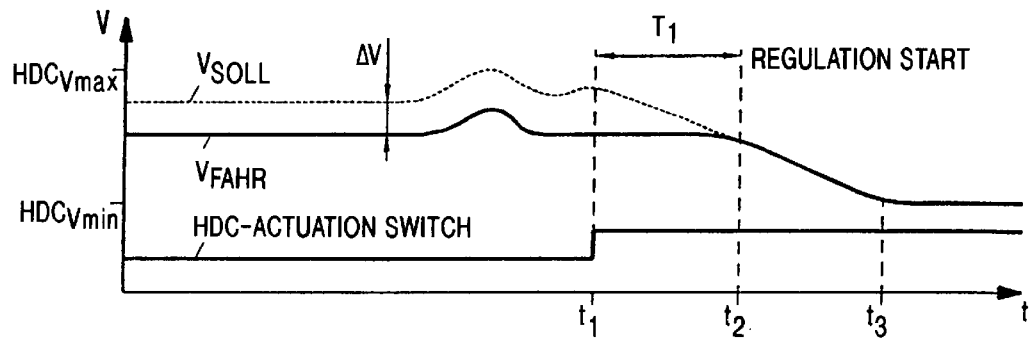
FIGS. 3 to 7 are diagrams of the HDC regulating process according to the present invention under different situations.

A more precise representation of the transition of the vehicle speed ($V_{Fahr}$) to the controlled, hill descent speed on the slope (HDC $V_{min}$) is shown in the diagram of FIG. 3.

The vehicle travels at first at a current vehicle speed $V_{Fahr}$ (solid line). Within the electronic system (9), a desired speed ($V_{soll}$) (dotted line) is generated. $V_{soll}$ is at first ΔV above the vehicle speed $V_{Fahr}$. A typical value for ΔV in this case is 5 to 7 km/h. ΔV can also be made dependent on vehicle speed, whereby the value of ΔV increases with the vehicle speed. The vehicle speed $V_{Fahr}$ in FIG. 3 is below a value HDC $V_{max}$ which is the maximum permissible regulated HDC speed. HDC $V_{max}$ in this case is approximately 50 km/h. Beyond this speed, no control is provided.

It is assumed that the driver actuates the actuating switch (11) at the point in time $t_1$ and thus switches on the HDC function. Thereupon, the desired speed $V_{soll}$ is lowered in the electronic system (9) in such a manner as to achieve a soft transition to the value HDC $V_{min}$. At the point in time $t_2$, the curve of the desired speed $V_{soll}$ intersects the curve of the vehicle speed $V_{Fahr}$. The vehicle speed $V_{Fahr}$ is adjusted at that time to the desired speed $V_{soll}$, so that the two curves are now congruent. $V_{soll}$ and $V_{Fahr}$ together with it are thereafter lowered gradually to HDC $V_{min}$. At the point in time $t_3$, the final speed HDC $V_{min}$ is reached. The vehicle is now maintained automatically at this constant descent speed until the actuating switch (11) is switched off. The time $T_1$ between the actuation of the actuating switch (11) at point in time $t_1$ and the intersection point of desired speed $V_{soll}$ and vehicle speed $V_{Fahr}$ (start of control to point in time $t_2$) depends on the prior vehicle behavior (e.g., accelerating or decelerating), the increase of $V_{soll}$ and the value of ΔV. This time $T_1$ typically has a value of approximately 0.5 s.

Figure 4:
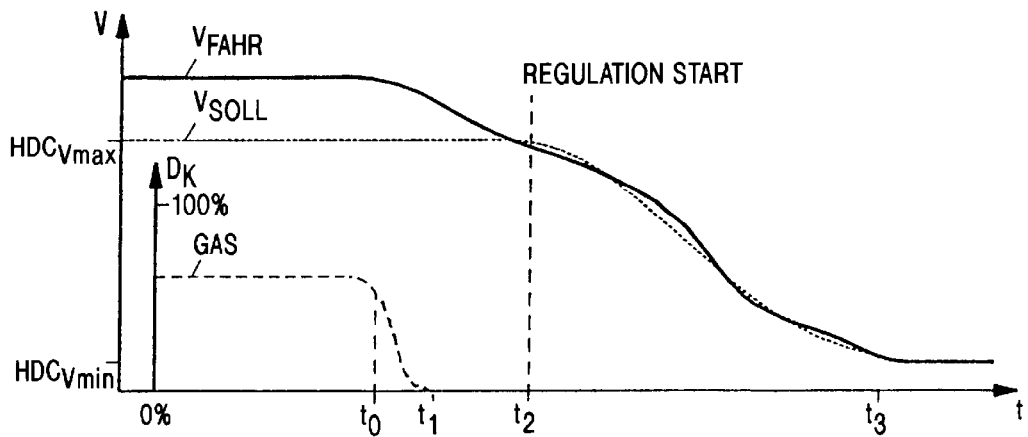

FIG. 4 is a diagram showing the transition from the so-called stand-by operation to the HDC control operation. The actuating switch (11) must be switched on for this. The starting speed of the vehicle $V_{Fahr}$ lies above the HDC control range, i.e., above the HDC $V_{max}$ control speed of approximately 50 km/h.

As the diagram shows, the driver eases back on the gas pedal or the throttle DK from approximately 60% to 0% between time $t_0$ and $t_1$. Thereupon the vehicle speed $V_{Fahr}$ is reduced until it intersects the desired speed $V_{soll}$=HDC $V_{max}$ at point in time $t_2$. At this point in time, the adjustment of the vehicle speed to the decreasing desired speed $V_{soll}$ predetermined by the electronic system (9) begins by means of active braking. At the point in time $t_3$, the HDC speed HDC $V_{min}$ is attained again and the vehicle is held at a constant speed of approximately 10 km/h with active braking.

If the gas pedal is not eased back completely to 0% at the point in time $t_0$, the vehicle speed $V_{Fahr}$ is maintained at a value which corresponds to the throttle position. In this case even a higher descending speed than HDC $V_{min}$=10 km/h can be set. In FIG. 4 for example, a descending speed of 20 km/h is shown. The relationship between throttle position and desired speed is calculated so that the engine (in the different gears different characteristic lines are used) cannot work against the brake.

Figure 5:
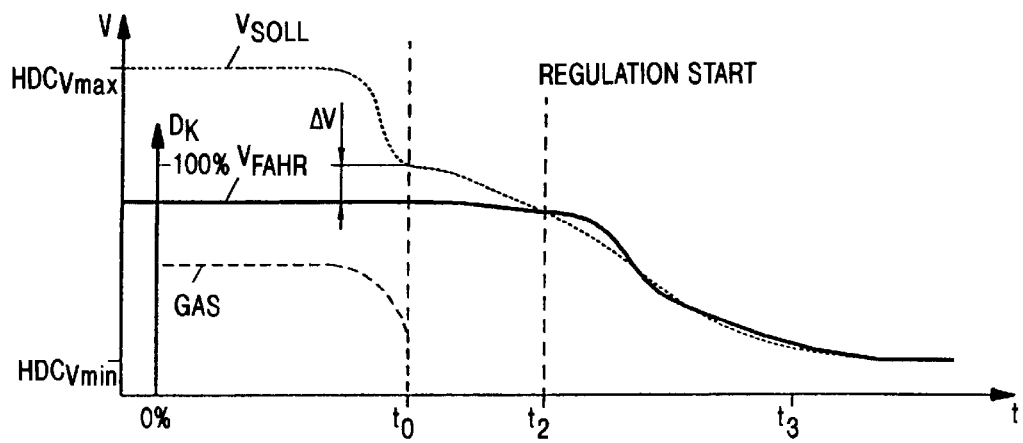

In the diagram of FIG. 5, the HDC control is shown again for a transition from stand-by operation to controlled operation. In this case, the original speed of the vehicle (ca. 30 km/h) is between HDC $V_{max}$ and HDC $V_{min}$.

The HDC actuating switch (11) is now switched on. The vehicle is in the rising phase of a hill crest at the beginning of the diagram. Shortly before point in time $t_0$, the driver eases up on the gas pedal since he is now at the apex of the hill crest. Before point in time $t_0$ and in accordance with the driver's wish (as indicated by the gas pedal position), the desired speed $V_{soll}$ is set at HDC $V_{max}$. As the gas pedal is released, $V_{soll}$ rapidly drops to $V_{Fahr}$+ΔV and is then further reduced at a predetermined rate. Starting at point in time $t_0$, the diagrams of FIGS. 5 and 3 are identical. This means that the desired speed $V_{soll}$ continues to be reduced and that it intersects the vehicle speed $V_{Fahr}$ at the point in time $t_2$. From that point in time on, the vehicle speed $V_{Fahr}$ is adjusted to the desired speed $V_{soll}$ and after a period of approximately 7 seconds, at point in time $t_3$, it reaches the constant hill descent speed HDC $V_{min}$ of approximately 10 km/h.

Figure 6:
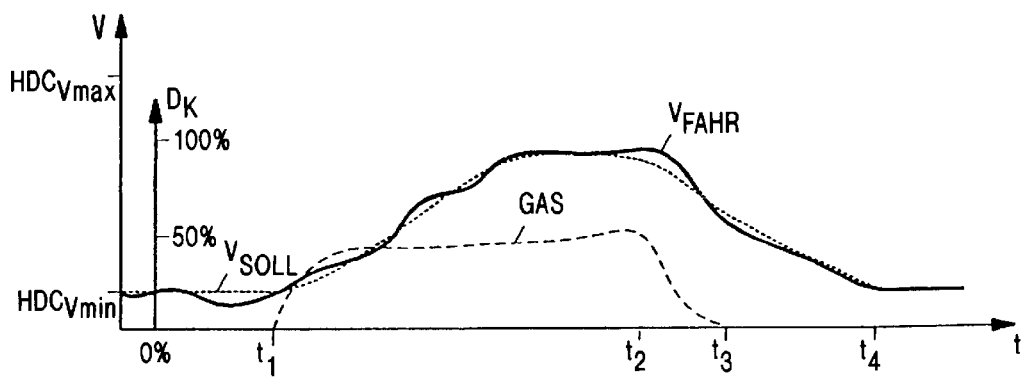

FIG. 6 is a diagram showing a starting state wherein the vehicle is traveling downhill at a speed HDC $V_{min}$ of approximately 10 km/h with active braking. At point in time $t_1$, the driver reconsiders and decides to increase his vehicle speed $V_{Fahr}$ by stepping on the gas pedal at point in time $t_1$. The ABS/ASR electronic system (9) then also increases the desired speed $V_{soll}$. Since the vehicle is adjusted to the changed desired speed $V_{soll}$, the vehicle speed $V_{Fahr}$ increases accordingly. The desired speed $V_{soll}$ increases at a predetermined rate to a new constant value through electronic control intervention. A rate greater than the predetermined one is not permitted. A throttle position of 0 to 30% is assigned a desired speed of HDC $V_{min}$ to HDC $V_{max}$. From point in time $t_2$ until point in time $t_3$, the driver removes his foot from the gas pedal again, so that the desired speed $V_{soll}$ and the vehicle speed $V_{Fahr}$ are again slowly adjusted to the starting value HDC $V_{min}$. The latter is attained at point in time $t_4$.

Immediate termination of control occurs when a desired speed greater than HDC $V_{max}$ is called for by the throttle (gas pedal) position. This is the case only when the gas pedal is set at more than approximately 30%.

For safety reasons, the HDC speed control function is allowed only when either the first gear, the reverse gear or an off-the-road gear (transmission switched on) is used.

Figure 7:
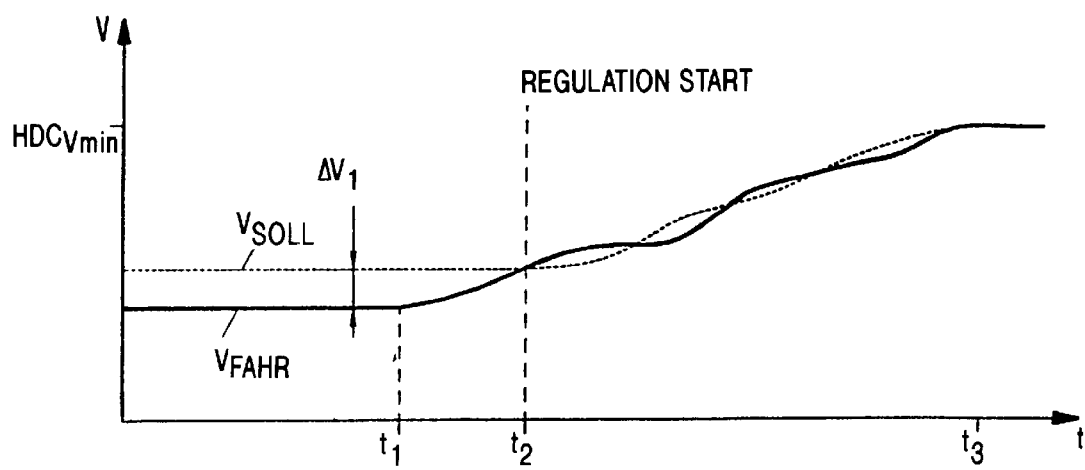

In FIG. 7 a transition from stand-by operation to HDC controlled operation is shown again. The original speed of approximately 4 km/h of the vehicle is however lower here than HDC $V_{min}$. The HDC actuating switch (11) is switched on. The vehicle continues to travel straight on.

Starting at the point in time $t_1$, the vehicle speed $V_{Fahr}$ increases and reaches the desired speed $V_{soll}$ at point in time $t_2$. $V_{soll}$ is above the previous vehicle speed, or above the vehicle speed which existed at the point in time when the actuating switch (1) was switched on, by the value ΔV1. Starting at point in time $t_2$, the vehicle speed $V_{Fahr}$ is again adjusted to the desired speed $V_{soll}$. The desired speed $V_{soll}$ is in turn changed within the electronic system (9) with a soft transition to the hill descending speed HDC $V_{min}$. It is attained approximately at point in time $t_3$.

As FIG. 7 shows, the desired speed $V_{soll}$ can also be lower than the limit speed HDC $V_{min}$. However, HDC $V_{min}$ still amounts to $V_{Fahr}$+ΔV1. The desired speed $V_{soll}$ increases at a predetermined rate only once it has been intersected by $V_{Fahr}$. In this manner a controlled vehicle acceleration is possible even on extremely steep slopes.

The person skilled in the art recognizes that the embodiments described above and the above-mentioned possibilities do not exhaust the area of protection of the invention, but that all embodiments with characteristics as mentioned in the claims fall under their protection.

We claim:

1. A process for controlling the speed of a vehicle traveling on a slope, the vehicle being equipped with an electronic system which, through active braking intervention, adjusts the vehicle speed to a predetermined constant hill descent speed upon actuation of a hill descent control mode, said process comprising:

continuously generating in said electronic system a variable desired speed, which prior to actuation of said hill descent mode is set at a value which is slightly above said vehicle speed, upon actuation of said hill descent control mode, adjusting said desired speed continuously until it is equal to said predetermined constant hill descent speed, and upon the desired speed becoming equal to the vehicle speed, continuously regulating said vehicle speed by active braking so that it remains equal to said desired speed as said desired speed is adjusted so that after a transition period, said vehicle speed is equal to said predetermined constant hill descent speed.

2. The process of claim 1 wherein said constant hill descent speed is approximately 10 km/h.

3. The process of claim 1 wherein said value is dependent upon the vehicle speed and is equal to approximately 5 to 7 km/h.

4. The process of claim 1 wherein the desired speed is limited to a permissible maximum speed.

5. The process of claim 4 wherein said permissible maximum speed is equal to approximately 50 km/h.

6. The process of claim 1 wherein said hill descent control mode is actuable only when said vehicle is in a first gear, an off-road gear, or in a reverse gear.

7. The process of claim 1 wherein said hill descent control mode is actuable only when the vehicle speed is below said permissible maximum speed.

8. The process of claim 1 wherein the desired speed can be increased proportionally to actuation of a gas pedal of the vehicle.

9. The process of claim 8 wherein the desired speed is limited to a permissible maximum speed.

10. The process of claim 1 wherein the temperatures of the vehicle brakes are monitored and a warning system is actuated when the temperature of one of the vehicle brakes exceeds a limit value.

\* \* \* \* \*